Figure 1:
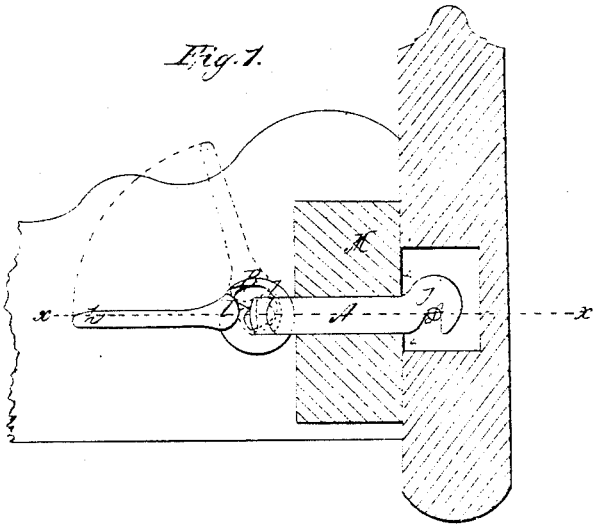
Figure 2:
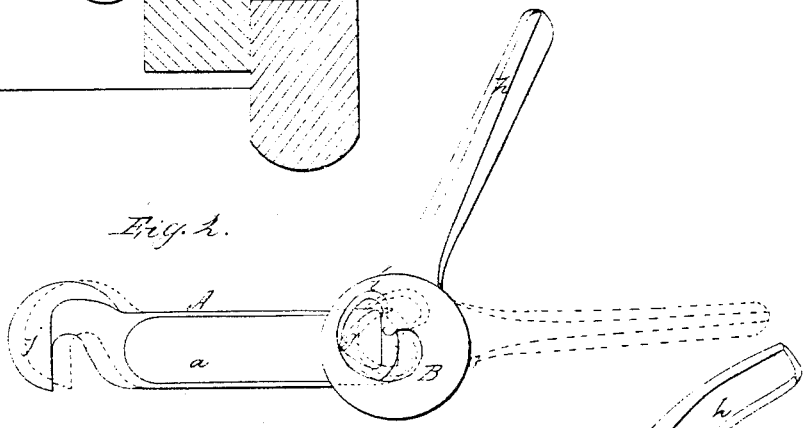
Figure 3:
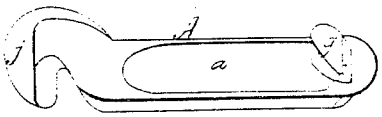

O. Robinson.

BEST AVAILABLE COPY

Bedstead Fastening,

A.I. No. 224, A.I. Mar. 22. 1859.

Witnesses.
J. Fraser
S. Allis.

Inventor.
Oliver Robinson

N. PETERS, PHOTO-LITHOGRAPHER, WASHINGTON, D. C.